(12) United States Patent
Braun et al.

(10) Patent No.: US 11,252,945 B2
(45) Date of Patent: Feb. 22, 2022

(54) BOTTLE-STYLE REEL BOW-FISHING REEL OUT OF PLANE BOTTLE AXIS

(71) Applicant: AMS, LLC, Stratford, WI (US)

(72) Inventors: Jeff Braun, Stratford, WI (US); Tim Morines, Abbotsford, WI (US); Mathew Schillinger, Stratford, WI (US)

(73) Assignee: AMS, LLC, Stratford, WI (US)

( * ) Notice: Subject to any disclaimer, the term of this patent is extended or adjusted under 35 U.S.C. 154(b) by 49 days.

(21) Appl. No.: 16/825,240

(22) Filed: Mar. 20, 2020

(65) Prior Publication Data

US 2020/0296944 A1    Sep. 24, 2020

Related U.S. Application Data

(60) Provisional application No. 62/821,816, filed on Mar. 21, 2019.

(51) Int. Cl.
| | | |
|---|---|---|
| *A01K 89/01* | (2006.01) | |
| *A01K 81/00* | (2006.01) | |
| *F41B 5/14* | (2006.01) | |
| *A01K 89/00* | (2006.01) | |

(52) U.S. Cl.
CPC ............ *A01K 81/00* (2013.01); *A01K 89/006* (2013.01); *F41B 5/1488* (2013.01)

(58) Field of Classification Search
CPC ................ A01K 81/00; A01K 89/0102; A01K 89/0108; A01K 89/081; A01K 91/02; F41B 5/1488; F41B 5/1484
See application file for complete search history.

(56) References Cited

U.S. PATENT DOCUMENTS

| | | | | |
|---|---|---|---|---|
| 4,383,516 A * | 5/1983 | La See | ................. | F41B 5/1488 124/80 |
| 4,744,347 A * | 5/1988 | Dodge | ................. | F41B 5/1488 124/86 |
| 6,634,350 B2 * | 10/2003 | LaSee | ................. | F41B 5/1488 124/86 |
| 9,043,999 B1 * | 6/2015 | Boester | ................. | A01K 91/02 |
| 9,383,160 B1 * | 7/2016 | White | ................. | A01K 89/006 |
| 2003/0136870 A1 * | 7/2003 | Braun | ..................... | A62B 1/06 242/360 |

* cited by examiner

*Primary Examiner* — Emmanuel M Marcelo
(74) *Attorney, Agent, or Firm* — Boyle Fredrickson S.C.

(57) ABSTRACT

A bottle-style reel for bow-fishing and the like provides a retriever bottle that is tipped out of the vertical plane defined by the crank axis and the rotation of interengaging wheels that grip the fishing line and push it into the retriever bottle. In this way the retriever mechanism of the interengaging wheels can be aligned with the bow grip for reduced torque and simplified mounting.

21 Claims, 4 Drawing Sheets

BOTTLE-STYLE REEL BOW-FISHING REEL OUT OF PLANE BOTTLE AXIS

CROSS REFERENCE TO RELATED APPLICATIONS

This application claims the benefit of U.S. Provisional Application No. 62/821,816, filed Mar. 21, 2019, hereby incorporated by reference.

BACKGROUND OF THE INVENTION

The present invention relates to a bottle-style reel for use in bow-fishing where fishing line is stored in a bottle for rapid payout behind an arrow and, in particular, to a bottle-style reel allowing improved axial alignment of the winding mechanism.

In bow-fishing, an arrow is fitted with a lightweight but sturdy line which may pay out behind the arrow when the arrow is shot from a bow. The line allows the arrow, and/or arrow and fish, to be retrieved after the shot.

It is important that before the release of the arrow, the line be stored without tangling and that after release of the arrow, the line be able to pay out rapidly with little resistance. Conventional reels, which rotate to wind or unwind line present substantial rotational inertia that can interfere with free flight of the arrow.

These problems of line storage and release for bow-fishing were addressed with the invention of the "bottle-style reel" described in U.S. Pat. No. 6,634,350 assigned to the assignee of the present invention. A bottle-style reel uses a pair of interengaging elastomeric wheels to grip the fishing line and rotate to push the line rearward into a bottle. Rather than being wound on a spool, the bottle stores the line in a loose bundle so that only the light weight of the line itself (rather than the inertial resistance of a spool of wound line) resists the arrow's force.

In the above design, one of the elastomeric wheels is be attached to a lever that can be activated to press the wheels into engagement about the fishing line. The lever may be operated by the hand of the archer that is also holding the bow. This frees the archer's other hand to turn a crank communicating with the rotating wheels to pull in the fishing line.

Because the winding mechanism in a bottle-style reel pushes rather than pulls the line into the bottle, the bottle is mounted so that it's opening is aligned with a tangent of the contact point between the elastomeric wheels to minimize bending of the line and contact between the line and the bottle, to the extent possible, that might prevent the line from filling the bottle.

Placement of the bottle aligned with and to the rear of the interengaging wheels requires that the bottle-style reel be mounted to the side of the bow so that the lever can be close enough to the bow to be activated by the archer's bow hand.

SUMMARY OF THE INVENTION

The invention provides a bow retriever with a bottle that is tipped "out of plane" allowing the bow retriever to be close to the bow for activation by the archer's bow hand while also being aligned with the plane of the bow. This latter alignment reduces torque on the bow when tension is applied to the line and minimizes lateral drag on the arrow such as may deflect the arrows path to the left or right.

Specifically, the invention provides a bottle-style reel having a crank arm providing a handle for rotation of the crank arm by a user and a first wheel communicating with a crank arm allowing rotation of the first wheel. A second wheel is movable between an engaged position operating to compress a fishing line between the second wheel and the first wheel so as to grip the line at a contact point within a plane perpendicular to the crank axis with rotation of the first and second wheels, and a disengaged position separating the first and second wheels to release line therebetween. A bottle receives line along a bottle axis tipped out of the plane.

It is thus a feature of at least one embodiment of the invention to shift the location of the bottle out of the normally vertical plane to permit the bottle-style reel to be manually operable by the archer's bow hand while being aligned with the plane of the bow to provide improved bow control with reduced torque between the archer's hand and bow grip and lateral drag the arrow during flight.

The bottle-style reel may include an operator communicating with the second wheel to move the second wheel between the engaged position and disengaged position with rearward movement of the actuator operator along an actuation axis within the plane.

It is thus a feature of at least one embodiment of the invention to align the operator with a plane holding the point of tension of the line on the bottle-style reel so that force by on the operator counters the force on the line without torque on the bow around the vertical axis that might loosen the archer's grip.

The operator may be either a linearly moving pull handle and a rotating pull lever.

It is thus a feature of at least one embodiment of the invention to provide a bottle-style reel that can work with standard operators familiar to archers.

The crank arm, first wheel, second wheel, and bottle may be supported by a housing and further including a mounting bar providing a rearwardly extending shaft within the plane adapted to attach to a bore through a bow so that the bore is aligned in the plane.

It is thus a feature of at least one embodiment of the invention to permit use of a standard bore for mounting accessories on bows to permit alignment of the bottle-style reel with the plane of the bow, permitting mechanically improved operation of the bottle-style reel by the archer's bow hand while limiting torque around a vertical axis that can loosen the archer's grip.

The crank arm, first wheel, second wheel, and bottle may be supported by a housing having a picatinny coupling at the bottom of the housing within the vertical plane.

It is thus a feature of at least one embodiment of the invention to provide an attachment method which allows easy adjustment of the bottle-style reel for operation by archers having different hand sizes.

The first and second wheels may about axes perpendicular to the plane and the contact point may at a contact between the first and second wheels and the fishing line.

It is thus a feature of at least one embodiment of the invention to permit simple connection of the crank arm to the first wheel without angle drives.

The bottle-style reel may further include a stripper providing a conduit between the contact point and the bottle for guiding the line into the bottle.

It is thus a feature of at least one embodiment of the invention to provide a guide ensuring the fishing line follows a path out of the plane.

The stripper may provide at least one straight path into the bottle along the plane.

It is thus a feature of at least one embodiment of the invention to minimize frictional contact between the stripper and the fishing line.

The bottle-style reel may further include a support frame holding the first and second wheels and crank arm and the stripper may attached to the frame and supports the bottle and wherein the stripper may be attached to the frame in a first position and a second position rotated 180° about an axis through the stripper.

It is thus a feature of at least one embodiment of the invention to provide out of plane bottle angulation for both left and right-handed archers by simple rotation of the stripper without other modifications.

The bottle may further include a housing supporting the first and second wheels for rotation and first and second wheels may be partially recessed within pockets of opposed and flanking walls of a housing supporting the first and second wheels.

It is thus a feature of at least one embodiment of the invention to prevent the fishing line from getting trapped between the housing and the wheels.

The housing may further include an eye guiding the fishing line through a front of the housing and the eye may have has a width no greater an exposed width of the first and second wheels outside of the pockets.

It is thus a feature of at least one embodiment of the invention to guide the fishing line along the midline of the wheels to reduce the tendency for line entrapment between the wheels and housing.

The pockets may be open downward for water drainage.

It is thus a feature of at least one embodiment of the invention to provide the benefits of recesses for holding the sides of the wheels while permitting the ejection of water and debris that might otherwise collect in these pockets.

The first and second wheels provide a tread pattern for gripping the fishing line.

It is thus a feature of at least one embodiment of the invention to provide improved gripping of the possibly wet fishing line to minimize the force needed to be applied to the operator.

The bottle may be substantially radially symmetric about the bottle axis.

It is thus a feature of at least one embodiment of the invention to provide for simple manufacture of the bottle.

The bottle-style reel may include a spring biasing the first wheel and second wheel apart.

It is thus a feature of at least one embodiment of the invention to provide a "failsafe" condition of the first and second wheels that prevent unexpected kickback if the wheels are engaged when the arrow was shot.

The housing may include a line guide guiding the fishing line out through a front opening of the line guide along a line axis where the front opening of the line guide has a width no greater than half an extended length of the line guide. The extended line guide may have an extended length that is at least 1.5 inches from a front of the housing.

It is thus a feature of at least one embodiment of the invention to extend the life of the reel by shifting the side torque of the line from being applied to the components of the housing to the front opening of the extended line guide positioned away from the housing. It is also a feature of at least one embodiment of the invention to provide additional leverage and side torque when pulling in or fighting a fish by placing the user's force on the reel closer to the force of the fish.

The housing may include a blade held within a shroud having a cut-out partially exposing the blade and adapted to receive a width of the fishing line for cutting.

It is thus a feature of at least one embodiment of the invention to provide a safe and user friendly cutting feature proximate a location where the fishing line leaves and enters the reel housing for ease of use.

These particular objects and advantages may apply to only some embodiments falling within the claims and thus do not define the scope of the invention.

DETAILED DESCRIPTION OF THE PREFERRED EMBODIMENT

Figure 1:
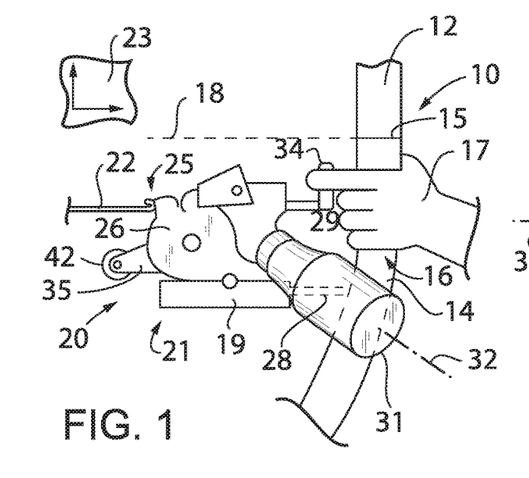
FIG. 1 is a fragmentary side elevational view of the bottle-style reel of the present invention mounted on a bow showing activation of the retriever pull handle using the bow hand and the tipping downward of the bottle.
Figure 2:
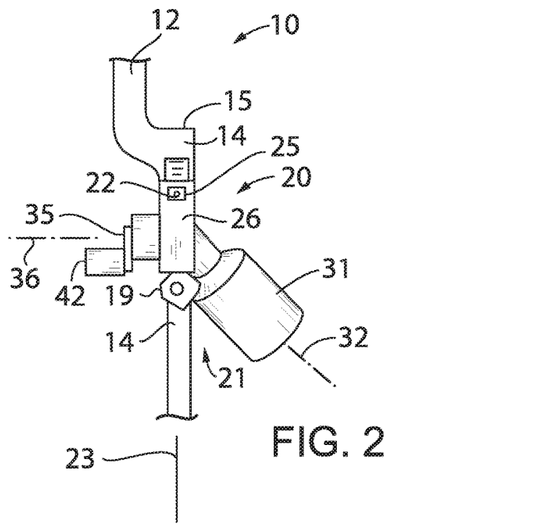
FIG. 2 is a fragmentary front elevational view similar to that of FIG. 1 showing tipping outward of the bottle from a vertical plane of the fishing line.

Referring now to FIGS. 1 and 2, a bow-fishing bow 10 may include a bow frame 12 presenting a vertically extending bow riser 14 providing a grip 16 for gripping by the bow hand 17 of the user during use of the bow 10. The bow riser 14 may provide an arrow shelf 15 above the grip 16 for supporting the arrow shaft (not shown) before release of the arrow for travel generally along axis 18.

A bottle-style reel 20 for storing and paying out fishing line 22 may be attached to the bow riser 14 beneath the grip 16 by means of a reel mount 21. The reel mount 21 may extend forward from the bow riser 14 beneath the bottle-style reel 20 aligned within a vertical plane 23 defined generally by the axis 18 and the direction of extension of the fishing line 22 from the bottle-style reel 20.

Figure 6:
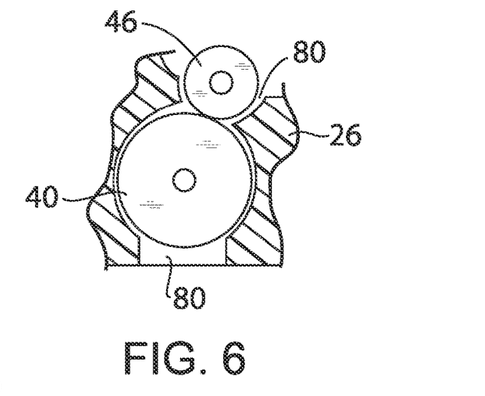
FIG. 6 is a fragmentary elevational view showing the recess pockets holding the top and bottom wheels such as open for water drainage at the bottom.

Referring momentarily to FIG. 6, the reel mount 21 may provide for an upwardly facing picatinny rail 19 engaging corresponding picatinny teeth on a coupling 24 attached to the lower portion of a housing 26 of the bottle-style reel 20. The picatinny rail 19 attaches at its rearward end to a shaft 28 extending horizontally within the vertical plane 23 to be received by a corresponding bore 30 in the riser 14 also extending horizontally within the vertical plane. A reel mount 21 suitable for use with the present invention is described generally in U.S. patent application Ser. No. 15/886,106 and titled "Bow-fishing Reel With Reduced Friction Payout" filed Feb. 8, 2018, assigned to the assignee of the present invention, and hereby incorporated by reference.

Referring again to FIGS. 1 and 2, the fishing line 22 exits from the housing 26 of the bottle-style reel 20 through a guide eye 25 positioned on a front surface of the housing 26. It will be appreciated that tension on the fishing line 22 acting on the guide eye 25 will generally tend to rotate the vertical plane 23 aligned with that tension vector so as to promote a natural orientation of the fishing bow 10 along a line of force required for retraction of the arrow and fish for improved reeling in of the line. Further, at the time of flight of the arrow, the fishing line 22 will be generally aligned in vertical plane 23 with the arrow flight axis 18 minimizing left and right torque on the arrow.

The bottle-style reel 20 will generally provide attachment to a proximal, open end 29 of a bottle 31, for example, being the bottle 31 generally radially symmetric about a bottle axis 32 which also defines the direction along which the bottle opens to receive fishing line 22 therein and the average trajectory of that received fishing line. The bottle axis 32 generally tips downwardly from horizontal as one moves along the bottle from the open end 29. The bottle axis 32 also and is also is tipped out of the vertical plane 23. This latter tipping of the bottle axis 32 allows the riser 14 to be closer to the housing 26 of the bottle-style reel 20 without interference between the riser 14 and the bottle 31.

Generally, the bottle axis 32 will be tipped downward by an angle of at least 10° or at least 20° measured in a vertical plane or at least 20° and the bottle axis 32 will be tipped outward by an angle greater than 30° or at least 45° measured in a horizontal plane.

A pull handle 34 may be engaged by a finger of the bow hand 17 of the user holding the bow 10 so that the pull handle 34 may be pulled rearwardly within the vertical plane 23. The tipping of the bottle 31, such as allows closer proximity of the bottle-style reel 20 to the bow-fishing bow 10 and alignment of the pull handle 34 with the grip 16 facilitates this operation. Generally, as will be discussed below, pulling backward on the pull handle 34 causes the bottle-style reel 20 to engage the fishing line 22 so that it may be drawn in by rotation of a crank arm 35 and ejected into the bottle 31. Release of the pull handle 34 causes a spring biased release of the fishing line 22 so that it may be freely pulled from the bottle 31 during the flight of an arrow. The crank arm 35 will generally rotate about a horizontal crank axis 36 perpendicular to the vertical plane 23 and hence may in part define the vertical plane 23 when the bottle-style reel 20 is not on the bow 10.

Figure 3:
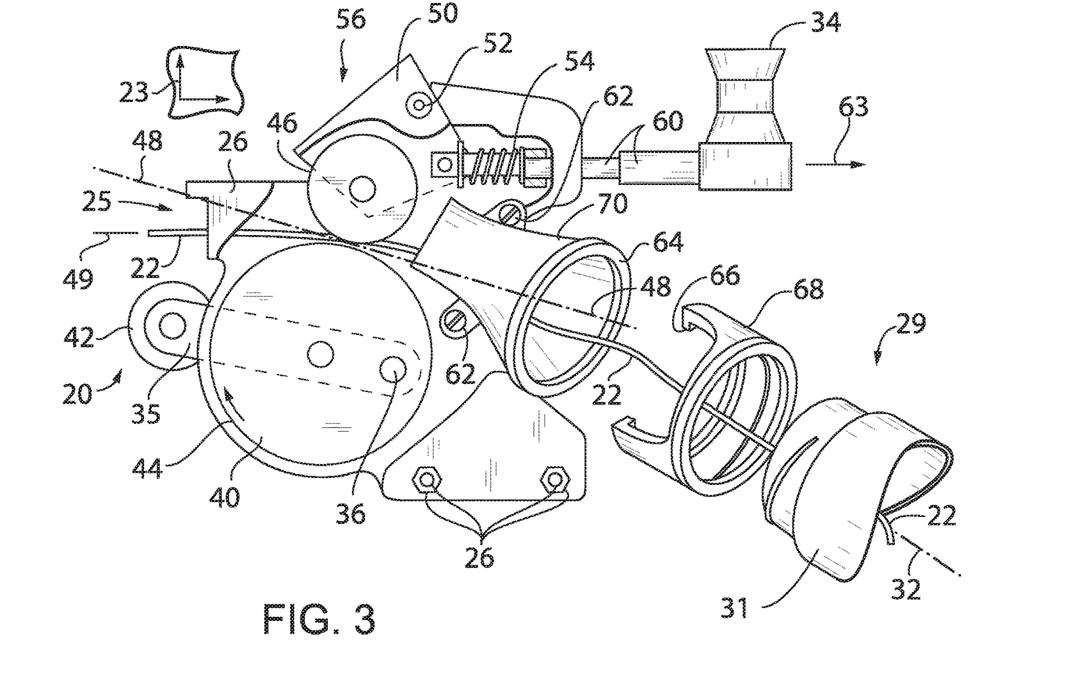
FIG. 3 is a fragmentary exploded view of the bottle-style reel of FIGS. 1 and 2 showing a stripper for receiving the fishing line and guiding it to the out-of-plane bottle.

Referring now to FIG. 3, the housing 26 of the bottle-style reel 20 may include a first drive wheel 40 communicating with the crank arm 35 through a gear train (not shown for clarity). The gear train operate so that rotation of the crank arm 35 about the crank axis 36 by means of crank handle 42, in a clockwise direction viewed from the side of the housing 26 of the crank arm 35, causes a clockwise rotation 44 of the wheel 40 that will serve to retrieve the fishing line 22.

This retrieval can occur when the fishing line 22 is pressed against an upper periphery of the wheel 40 by a gripper wheel 46 (shown in FIG. 3 in an engaged position). In this engaged position, a point of closest approach of wheel 40 and 46 defines a tangent line 48 generally within the vertical plane 23 proceeding forward at an angle slightly greater than a horizontal axis 49 shown aligned with the fishing line 22 and generally parallel to the extent of the reel mount 21. It will be understood that the horizontal axis 49 is also generally perpendicular to the vertical of the grip 16. Similarly, the tangent line 48 proceeds rearwardly angle slightly below the horizontal axis 49 to better align with the downwardly tipped bottle 31.

The axis of rotation of wheel 40 is generally parallel to the crank axis 36 and fixed with respect to the housing 26. The axis of rotation of the wheel 46 is parallel to the wheel 40 but in contrast to the wheel 40 is not fixed with respect to the housing 26. Instead axis of the wheel 46 is mounted to a pivot arm 50 pivoting about point 52 with respect to the housing 26. Pivoting of the pivot arm 50 may lift the wheel 46 away from the wheel 40 allowing free passage of the fishing line 22. A spring 54 operating between the housing 26 and the pivot arm 50 biases the wheel 46 away from the wheel 40 in an opposite direction to engagement arrow 56.

A pull handle 34 attaches to a linearly sliding shaft 60 movable along a retraction axis 63 generally horizontal and within the vertical plane 23. The opposite end of the shaft 60 from the pull handle 34 passes coaxially through the spring 54 and attaches to the pivot arm 50 so as to pivot the pivot arm 50 against the force of the spring 54 in the direction of arrow 56 when it is desired to engage the fishing line 22 between the wheels 46 and 40. In this engaged position, rotation of the crank arm 35 ejects the fishing line 22 rearwardly toward the bottle 31.

In order to provide a corralling of the fishing line 22 on its path from the wheels 40 and 46 into the bottle 31, a stripper 70 is placed immediately behind the contact point between the wheels 40 and 46 during engagement and provides a conduit to receive the ejected string at a proximal end along tangent line 48. The stripper 70 attaches to the housing 26 by means of screws 62 which will be discussed below. The stripper 70 supports of the bottle 31 at a distal end by means of a radial flange 64 extending outward at the distal end of the stripper 70 engaging a corresponding flange 66 on a screw cap 68 that may rotate relative to the stripper 70. The screw cap 68 engaging threadably with the top of the bottle 31 allowing bottle 31 to be easily removed for cleaning or the like.

Figure 4:
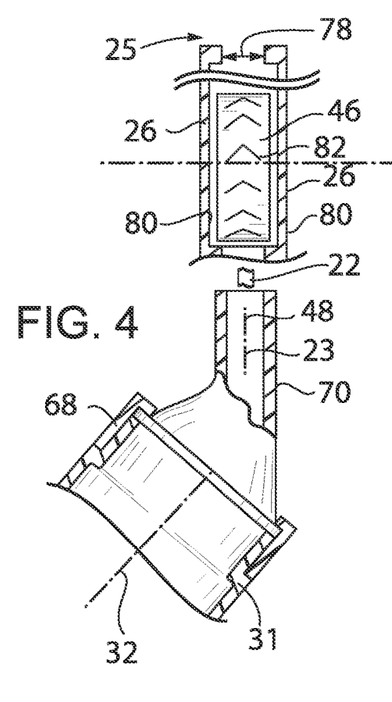
FIG. 4 is a top plan view in partial cutaway of a top guide wheel ejecting the fishing line into the stripper for guidance into the bottle and showing a recessing of the top guide wheel within flanking walls of the housing.

Referring now to FIG. 4, the proximal end of the stripper 70 provides a conduit generally aligned with the ejection axis 48 and the vertical plane 23 when the stripper 70 is attached to the housing 26. The distal end of the stripper 70, however, tips by 45° (or at least 30°) respect to the conduit provided by the proximal end of the stripper 70 to support the bottle 31 with the bottle axis out of plane as described.

Generally, the conduit provided by the stripper 70 provides a straight line path from a contact point between the wheels 40 and 46 through the stripper 70 to the bottle 31 thus reducing friction between the walls of the stripper 70 and the fishing line 22 when fishing line 22 is ejected into the bottle 31. Generally, the inner surfaces of the stripper 70 are smooth and curved to reduce any catching of the fishing line 22 during insertion or retraction from the bottle 31.

Figure 7:
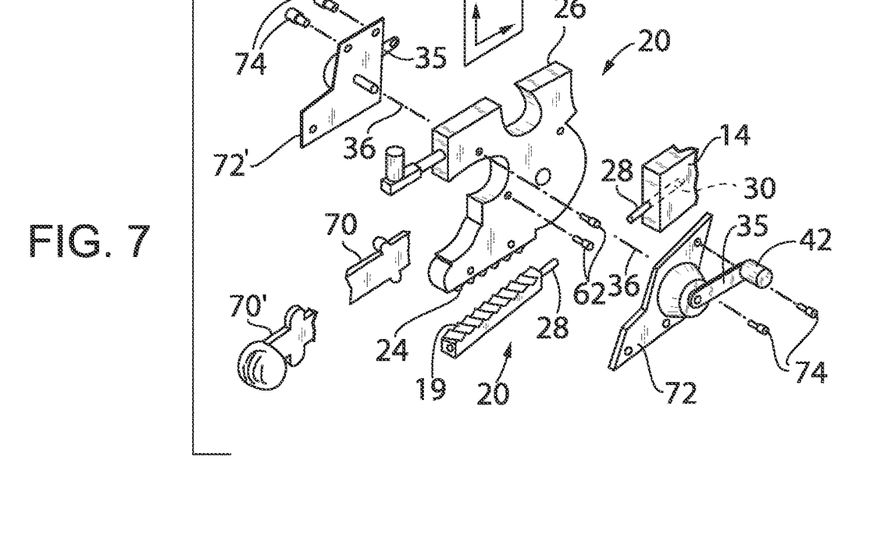
FIG. 7 is an exploded view of a first and second crank arm assembly for driving the lower wheel to allow left or right-handed use of the bottle-style reel and showing alternate orientations of the stripper when the different crank arm assemblies are used to provide proper angulation of the bottle.

Referring now to FIG. 7, screws 62 may attached the stripper 70 to the housing 26 in either a first orientation (denoted by stripper 70) for right-handed operation of the bottle-style reel 20 or second position (designated by stripper 70') for left-handed operation of the bottle-style reel 20 with a simple 180° rotation of the stripper 70 about the axis of its proximal end conduit. Completion of the left or right-handed bottle-style reels 20 is provided by attaching either a right-handed crank arm assembly 72 to the right side of the housing 26 or left-handed crank arm assembly 72' to the left side of the housing 26 as necessary. Each of these crank arm assembly 72 may drive the wheel 40 from either the left side or the right side of the housing 26 and includes the crank arm 35, crank handle 42, and an internal gear train and may be attached by one or more screws 74. Lower parts of the crank arm assembly 72 may provide a flange helps grip the reel mount 21, for example, as compressed against the reel mount 21 bolts and nuts 76.

Figure 5:
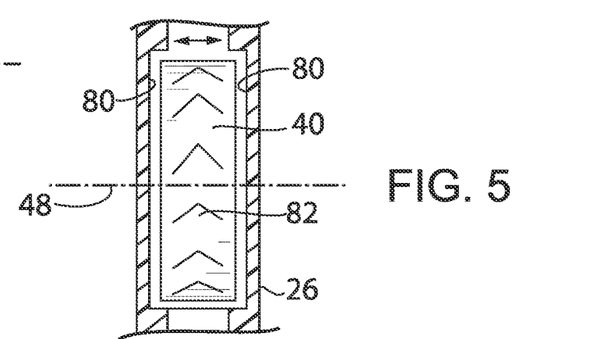
FIG. 5 is a figure similar to that of FIG. 4 showing a recessing of the bottom guide wheel.

Referring again to FIGS. 4 and 5, a width 78 of the eye 25 along a horizontal plane will be generally less than a corresponding width of the upper wheel 46 or lower wheel 40 measured along their axes of rotation. In this way, the eye 25 guides the fishing line 22 toward the center line of the circumference each of the wheels 46 and 40 along its width. In this respect, the wheels 46 and 40 may be recessed within pockets 80 formed in the inner walls of the housing 26 flanking the wheels 46 and 40 respectively to prevent the fishing line 22 from getting trapped between the opposite planar walls of the wheels 46 and 40 and the opposed walls of the housing 26.

Referring also to FIG. 6, these pockets 80 are constructed to be open at their bottom ends to allow ready drainage of water and ejection of debris that may become positioned between the wheels 40 and 46 and the opposed walls of the pockets 80 of housing 26.

Referring again to FIGS. 4 and 5, the outer periphery of the wheels 46 and 40 may be embossed to produce a tread 82 to improve the grip of the wheels 40 and 46 on wet fishing line 22 and to help expel water from that line. In this regard the tread 82 may help center the line along the midlines of the wheels 46 and 40 together with the eye 25. In one embodiment the tread 82 may have a tread depth of at least ¹⁄₆₄ inch and preferably at least one 32nd inch and may for example provide for a chevron pattern pointed away from the stripper 70.

Figure 8:
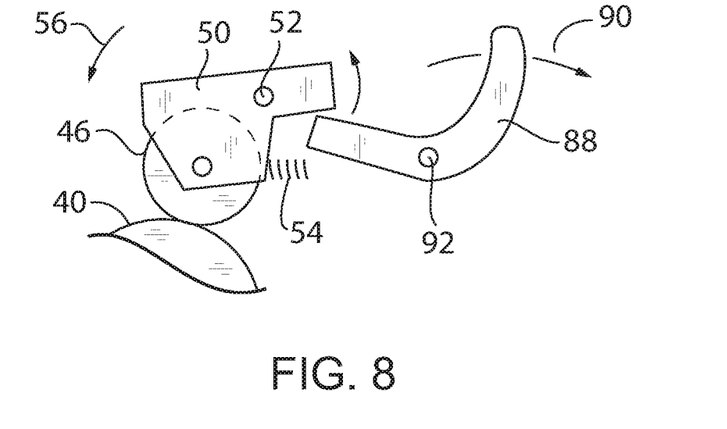
FIG. 8 is a side elevational fragmentary view of an alternative embodiment of the invention using a rotating lever rather than a linearly moving pull handle.

Referring now to FIG. 8, the embodiment shown in FIG. 3 may be modified slightly to replace the pull handle 34 with a pivoting pull lever 88 that may be pulled backward along arc line 90 generally in the direction of the retraction axis 63 shown in FIG. 3 but causing a pivoting action of the pull lever 88 about pivot 92 affixed to the housing 26 (not shown for clarity in FIG. 8). Pivoting of the lever 88 presses upward on a feature of the pivot arm 50 causing it to pivot in the direction of arrow 56 into engagement. Release of the lever 88 causes the wheel 46 to move away from wheel 40 under the influence of spring 54 now independent of the shaft 60.

The fishing line 22 used in this capacity may be, for example, a braided rather than monofilament line, for example, a braided 200-pound test, that may be readily distinguished from, for example, a fly casting line by its greater strength and substantially greater outer diameter.

The vertical plane 23 described herein should be understood in the light of reasonable manufacturing tolerances and the requirements of reducing torque on the bow 10. For that reason the vertical plane 23 may be considered a surface of infinite extent having a finite width of at least ¼ inch and preferable ½ inch or 1 inch such as moderates torque caused by opposite forces within the plane 23

Figure 9:
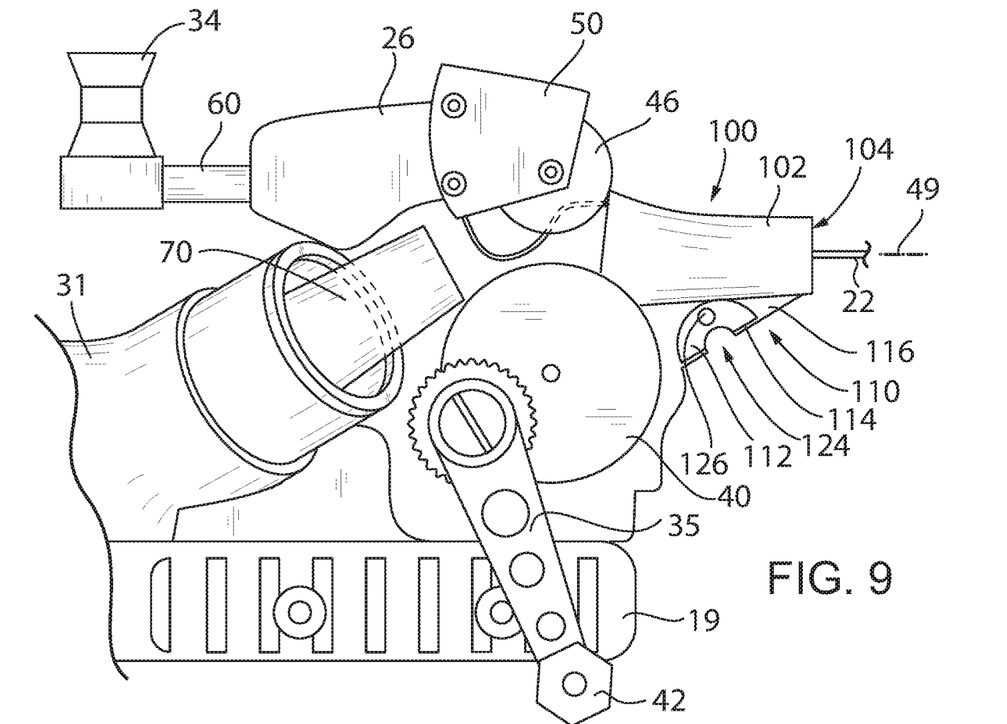
FIG. 9 is a side elevational fragmentary view of an alternative embodiment of the invention having an extended line guide and cutting blade.
Figure 10:
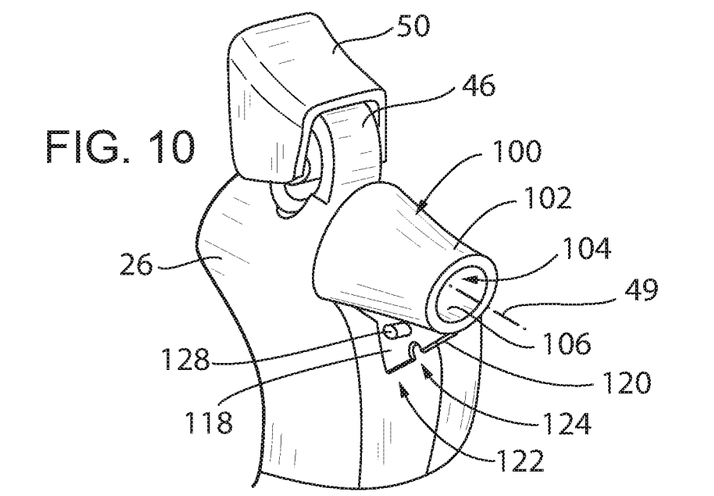
FIG. 10 is a front perspective fragmentary view of the alternative embodiment of the invention of FIG. 9 showing the front end of the extended line guide and cutting blade.

Referring now to FIGS. 9 and 10, the embodiment shown in FIG. 3 may be modified slightly to replace the guide eye 25 with an extended line guide 100 positioned on a front surface of the housing 26 and extending forward along the horizontal axis 49. The extended line guide 100 may provide a radial flange 102 tapering to a narrowed front opening 104 aligned along the horizontal axis 49 of the fishing line 22. The extended line guide 100 extends forward from the housing 26 such that when the fishing line 22 is pulled tight through the front opening 104 and against an outer periphery of the radial flange 102, the fishing line 22 is substantially aligned with the horizontal axis 49 facilitating free-spooling and retrieval of the fishing line 22 into and out of the housing 26. The extended line guide 100 also minimizes tangling resulting from bunching of the fishing line 22 which might occur at the front of the housing 26.

In one embodiment, the extended line guide 100 may extend forward from the front surface of the housing 26, with the front opening 104 of the extended line guide 100 extending a distance of at least 1.5 inches, and at least 1.75 inches, and at least 2 inches, and generally between 1.5 to 2 inches from the front surface of the housing 26.

At its proximal attachment to the front surface of the housing 26, the extended line guide 100 may have a width that is at least the same width of the upper wheel 46 or lower wheel 40 measured along their axes of rotation. In this respect, the extended line guide 100 may readily receive the fishing line 22 from between the upper and lower wheels 46, 40. At its extended distal end, the width of the front opening 104 of the extended line guide 100 may be narrower, and generally less than the width of the upper wheel 46 or lower wheel 40 measured along their axes of rotation, and to at least half the length of the extended line guide 100, and may be less than 1 inch, and less than 0.75 inches, and less than 0.5 inches in width. Therefore, the extended line guide 100 receives the fishing line 22 from the upper wheel 46 and lower wheel 40 but then narrows to guide the fishing line 22 to close alignment with the horizontal axis 49.

The forward extension of the front opening 104 of the extended line guide 100 provides for additional leverage and thus additional side torque on the housing 26 for pulling in or fighting a fish by placing the user's "effort force" on the housing 26 closer to the fish "load" (similar to a class three lever). The extended line guide 100 may also protect the internal components of the housing 26, such as upper wheel 46 and lower wheel 40, from damage by distancing the side torque on the fishing line 22 from those internal components.

Generally, the inner surfaces 106 of the radial flange 102 are smooth and curved to reduce any catching of the fishing line 22 during insertion or retraction from the housing 26 and to reduce friction causing the fishing line 22 to break. In one embodiment, the radial flange 102 may be constructed of an aluminum tube surrounded by a plastic injection molded shell. The material of the radial flange 102 may be durable to withstand and reduce the friction of the fishing line 22 placed on the front end of the extended line guide 100.

The extended line guide 100 may be integral with the housing 26 thus eliminating the need for additional attachments or parts to be attached to the housing 26. The extended line guide 100 may generally replace, but serve a similar purpose as, a torque rod or outrigger arm that would be attached to a front end of the picatinny rail 19, for example, as described in U.S. patent application Ser. No. 15/886,106 and titled "Bow-fishing Reel With Reduced Friction Payout" filed Feb. 8, 2018, assigned to the assignee of the present invention, and hereby incorporated by reference.

Still referring to FIGS. 9 and 10, the embodiment shown in FIG. 3 may also be modified to include a cutting blade 110 positioned on a front surface of the housing 26 near the front opening 104. The cutting blade 110 may include an arcuate blade 112 taking a half-circular shape with a flat sharpened edge 114 and protected by a shroud 116 providing a left sidewall 118 and right sidewall 120 defining a slot 122 therebetween receiving the arcuate blade 112 therein. An outer edge of the shroud 116 includes a circular cutout 124 allowing the arcuate blade 112 to be partially exposed revealing the sharpened edge 114 of the arcuate blade 112 for cutting generally at a lower end of the shroud 116. The circular cutout 124 defines a groove extending perpendicular to the horizontal axis 49 and sized to receive the fishing line 22 perpendicular to the horizontal axis 49 to allow the user to easily cut the fishing line 22 by placing the fishing line 22 within the groove and against the arcuate blade 112.

The arcuate blade 112 may be replaced by removing the arcuate blade 112 along and out from the slot 122 of the shroud 116. A new arcuate blade 112 may be secured within the shroud 116 using, for example, a screw 126 extending through a hole 128 toward a center of the arcuate blade 112 (FIG. 10 showing the arcuate blade 112 removed from the cutting blade 110) that is loosened or tightened to remove and secure the arcuate blade 112, respectively. The arcuate blade 112 may be manufactured out of a material that is rust-resistant, for example, a non-ferrous material such as ceramic which is also non-corrosive and hard to withstand moisture and generally wear and tear associated with repeated outdoor use of the bottle-style reel 20.

The cutting blade 110 may be integral with the housing 26, thus eliminating the need for additional attachments or parts. It is understood that the cutting blade 110 may be positioned at any location on the housing 26 allowing for cutting of the fishing line 22 but generally positioned proximate the ingress and egress opening of the fishing line 22 into and out of the housing 26 and away from the user's fingers during normal use of the bottle-style reel 20.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A bottle-style reel comprising:
a crank arm providing a handle for rotation of the crank arm about a crank axis by a user;
a first wheel communicating with the crank arm allowing rotation of the first wheel;
a second wheel movable between an engaged position operating to compress a fishing line between the second wheel and the first wheel at a contact point within a plane perpendicular to the crank axis with rotation of the first and second wheels, and a disengaged position separating the first and second wheels to release the fishing line therebetween; and
a bottle receiving the fishing line along a bottle axis tipped out of the plane.

2. The bottle-style reel of claim 1 further including an operator communicating with the second wheel to move the second wheel between the engaged position and disengaged position with rearward movement of the operator along an actuation axis within the plane.

3. The bottle-style reel of claim 2 wherein the operator is selected from the group consisting of a linearly moving pull handle and a rotating pull lever.

4. The bottle-style reel of claim 1 wherein the crank arm, first wheel, second wheel, and bottle are supported by a housing and further including a mounting bar providing a rearwardly extending shaft within the plane adapted to attach to a bore through a bow having a bore axis so that the bore axis is aligned with the plane.

5. The bottle-style reel of claim 1 wherein the bottle axis is tipped downward as one moves away from the first and second wheels.

6. The bottle-style reel of claim 1 wherein the crank arm, first wheel, second wheel, and bottle are supported by a housing having a picatinny coupling at a bottom of the housing within the plane.

7. The bottle-style reel of claim 1 wherein the first and second wheels rotate about axes perpendicular to the plane and the fishing line ejects at a tangent of a contact point between the first and second wheels and the fishing line in the plane.

8. The bottle-style reel of claim 1 further including a stripper providing a conduit between the contact point and the bottle for guiding the fishing line into the bottle.

9. The bottle-style reel of claim 8 wherein the stripper provides at least one straight path into the bottle along the plane.

10. The bottle-style reel of claim 8 further including a support frame holding the first and second wheels and crank arm and wherein the stripper attaches to the frame and supports the bottle and wherein the stripper may be attached to the frame in a first position and a second position rotated 180° about an axis through the stripper.

11. The bottle-style reel of claim 1 further including a housing supporting the first and second wheels for rotation wherein the first and second wheels are partially recessed within pockets of opposed and flanking walls of the housing supporting the first and second wheels.

12. The bottle-style reel of claim 11 wherein the housing further includes an eye guiding the fishing line through a front of the housing and wherein the eye has a width no greater an exposed width of the first and second wheels outside of the pockets.

13. The bottle-style reel of claim 11 wherein the pockets open downward for water drainage.

14. The bottle-style reel of claim 1 further including a housing supporting the first and second wheels for rotation and supporting a line guide guiding the fishing line out through a front opening of the line guide along a line axis wherein the front opening of the line guide has a width no greater than half an extended length of the line guide.

15. The bottle-style reel of claim 14 wherein the extended length of the extended line guide is at least 1.5 inches from a front of the housing.

16. The bottle-style reel of claim 1 wherein the first and second wheels provide a tread pattern for gripping the fishing line.

17. The bottle-style reel of claim 1 wherein the bottle is substantially radially symmetric about the bottle axis.

18. The bottle-style reel of claim 1 wherein the bottle axis defines an average travel of line ejected into the bottle.

19. The bottle-style reel of claim 1 further including a spring biasing the first wheel and second wheel apart.

20. The bottle-style reel of claim 1 wherein the bottle is tipped at least 30° from the plane.

21. The bottle-style reel of claim 1 further including a housing supporting the first and second wheels for rotation and supporting a blade held within a shroud having a cut-out partially exposing the blade and adapted to receive a width of the fishing line for cutting.

* * * * *